US012110210B2

(12) United States Patent
Vushakola et al.

(10) Patent No.: US 12,110,210 B2
(45) Date of Patent: Oct. 8, 2024

(54) SYSTEM FOR TRACKING ELEVATOR RIDE QUALITY

(71) Applicant: OTIS ELEVATOR COMPANY, Farmington, CT (US)

(72) Inventors: Ranjith Vushakola, Telangana (IN); Srinivasa Rao Ladi, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1388 days.

(21) Appl. No.: 16/658,623

(22) Filed: Oct. 21, 2019

(65) Prior Publication Data

US 2020/0122968 A1 Apr. 23, 2020

(30) Foreign Application Priority Data

Oct. 22, 2018 (IN) ............................ 201811039794

(51) Int. Cl.
*B66B 5/00* (2006.01)
*B66B 1/34* (2006.01)
*B66B 3/00* (2006.01)

(52) U.S. Cl.
CPC .......... *B66B 5/0037* (2013.01); *B66B 1/3461* (2013.01); *B66B 3/00* (2013.01)

(58) Field of Classification Search
CPC ....... B66B 3/00; B66B 5/0018; B66B 5/0012; B66B 5/0037; B66B 1/3492; B66B 3/002; B66B 5/0087; B66B 1/3446; B66B 5/0006; B66B 25/006; B66B 2201/401
See application file for complete search history.

(56) References Cited

U.S. PATENT DOCUMENTS 8,463,635 B1 6/2013 Mangalam et al.
8,540,057 B2 9/2013 Schuster et al.
9,556,002 B2 1/2017 Wilke et al.
9,604,818 B2 3/2017 Kallioniemi et al.
(Continued)

FOREIGN PATENT DOCUMENTS

CN 102556792 A 7/2012
CN 102656109 A 9/2012
(Continued)

OTHER PUBLICATIONS

CN Office Action; Application No. 201911000362.X; dated Oct. 26, 2020; 7 pages.
(Continued)

*Primary Examiner* — Marlon T Fletcher
(74) *Attorney, Agent, or Firm* — CANTOR COLBURN LLP

(57) ABSTRACT

Disclosed is an elevator system including an elevator car, a sensor operationally connected to the elevator car, and a smart device configured to: display collected sensor data, instruct the sensor to dynamically collect sensor data, displaying dynamically collected data, thereby dynamically illustrating trends in the sensed data. Further disclosed is a method of collecting sensor data in an elevator system using one or more features and elements of the disclosed elevator system, wherein the method includes display collected sensor data, instructing the sensor to dynamically collect sensor data, and displaying dynamically collected data, thereby dynamically illustrating trends in the sensed data.

10 Claims, 3 Drawing Sheets

(56) References Cited

U.S. PATENT DOCUMENTS

| | | | | |
|---|---|---|---|---|
| 2002/0138327 | A1 | 9/2002 | Mello et al. | |
| 2015/0014098 | A1 | 1/2015 | Stolzl et al. | |
| 2015/0284214 | A1 | 10/2015 | Park et al. | |
| 2017/0029244 | A1 | 2/2017 | Madarasz et al. | |
| 2018/0332368 | A1* | 11/2018 | Copeland | H04W 4/33 |
| 2018/0346287 | A1* | 12/2018 | Fragner | B66B 25/006 |
| 2020/0122968 | A1* | 4/2020 | Vushakola | B66B 3/00 |

FOREIGN PATENT DOCUMENTS

| | | | | | |
|---|---|---|---|---|---|
| CN | 203229283 | U | | 10/2013 | |
| CN | 102633173 | A | | 10/2014 | |
| CN | 102897623 | B | | 12/2014 | |
| CN | 204689297 | U | | 10/2015 | |
| CN | 105731209 | A | | 7/2016 | |
| CN | 105836560 | A | | 8/2016 | |
| CN | 105923483 | A | | 9/2016 | |
| CN | 106672724 | A | | 5/2017 | |
| CN | 107473036 | A | | 12/2017 | |
| DE | 102018211776 | A1 | * | 1/2020 | |
| EP | 2336070 | A1 | * | 6/2011 | B66B 1/06 |
| EP | 3075692 | A1 | * | 10/2016 | B66B 1/2408 |
| EP | 3075697 | A1 | * | 10/2016 | B66B 1/3461 |
| EP | 3076247 | A1 | * | 10/2016 | B66B 1/2408 |
| EP | 3190075 | A1 | | 7/2017 | |
| EP | 3643663 | A1 | * | 4/2020 | B66B 1/2408 |
| JP | 2007176618 | A | | 7/2007 | |
| JP | 4550448 | B2 | | 9/2010 | |
| JP | 2014208559 | A | * | 11/2014 | B66B 1/06 |
| KR | 20120077181 | A | * | 7/2012 | |
| KR | 20160047068 | A | * | 5/2016 | |
| KR | 2019049602 | A | * | 5/2019 | B66B 1/3446 |
| KR | 20190049602 | A | * | 5/2019 | |
| WO | WO-2014006766 | A1 | * | 1/2014 | B66B 5/0018 |
| WO | WO-2016091309 | A1 | * | 6/2016 | B66B 1/28 |
| WO | 2017001531 | A1 | | 1/2017 | |
| WO | 2018151403 | A2 | | 8/2018 | |
| WO | 2018166994 | A1 | | 9/2018 | |

OTHER PUBLICATIONS

Harmon, B. et al. Educational Focus: Testing Equipment—Elevator Performance Meter vs. Ride Analysis Tools. Educational Focus Compilation. Date Accessed: Oct. 15, 2018. Retrieved from < http://www.elevatorworld.com/pdf/ed_book_chapters/ed_focus/Chapter_15.pdf >. 12 Pages.

Zhang, Y. et al. "Elevator ride comfort monitoring and evaluation using smartphones", Mechanical Systems and Signal Processing, vol. 105, May 15, 2018, pp. 377-390, Abstract Only.

Extended European Search Report; Application No. 19204716.5; dated Mar. 20, 2020; 5 pages.

* cited by examiner

SYSTEM FOR TRACKING ELEVATOR RIDE QUALITY

CROSS-REFERENCE TO RELATED APPLICATIONS

This application claims the benefit of Indian Application No. 201811039794, filed Oct. 22, 2018, the disclosure of which is incorporated herein by reference in its entirety.

BACKGROUND

The embodiments herein relate to an elevator system and more specifically to an elevator system for tracking elevator ride quality.

With current elevator diagnostic systems it may be a challenge for a mechanic to view ride quality insights as needed.

SUMMARY

Disclosed is an elevator system including an elevator car, a sensor operationally connected to the elevator car, and a smart device configured to: display collected sensor data, instruct the sensor to dynamically collect sensor data, displaying dynamically collected data, thereby dynamically illustrating trends in the sensed data. Further disclosed is a method of collecting sensor data in an elevator system using one or more features and elements of the disclosed elevator system, wherein the method includes display collected sensor data, instructing the sensor to dynamically collect sensor data, and displaying dynamically collected data, thereby dynamically illustrating trends in the sensed data.

In addition to one or more of the above disclosed features and elements or as an alternate the sensor is configured to sense a ride characteristic.

In addition to one or more of the above disclosed features and elements or as an alternate the ride characteristic is ride quality.

In addition to one or more of the above disclosed features and elements or as an alternate the smart device is configured to instruct the sensor to adjust sensitivity levels.

In addition to one or more of the above disclosed features and elements or as an alternate the smart device provides a scheduling calendar for scheduling elevator diagnostics based on the identified sensor trends.

In addition to one or more of the above disclosed features and elements or as an alternate the smart device is a mobile phone.

In addition to one or more of the above disclosed features and elements or as an alternate the smart device communicates with the sensor over a wireless ad hoc network.

In addition to one or more of the above disclosed features and elements or as an alternate the system further comprises a controller for operatively communicating with the sensor over a local area network and communicating with the smart device over a personal area network.

In addition to one or more of the above disclosed features and elements or as an alternate the system further comprises a telecommunications beacon for effecting communications with the smart device over the personal area network.

In addition to one or more of the above disclosed features and elements or as an alternate the controller is a building management system (BMS).

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
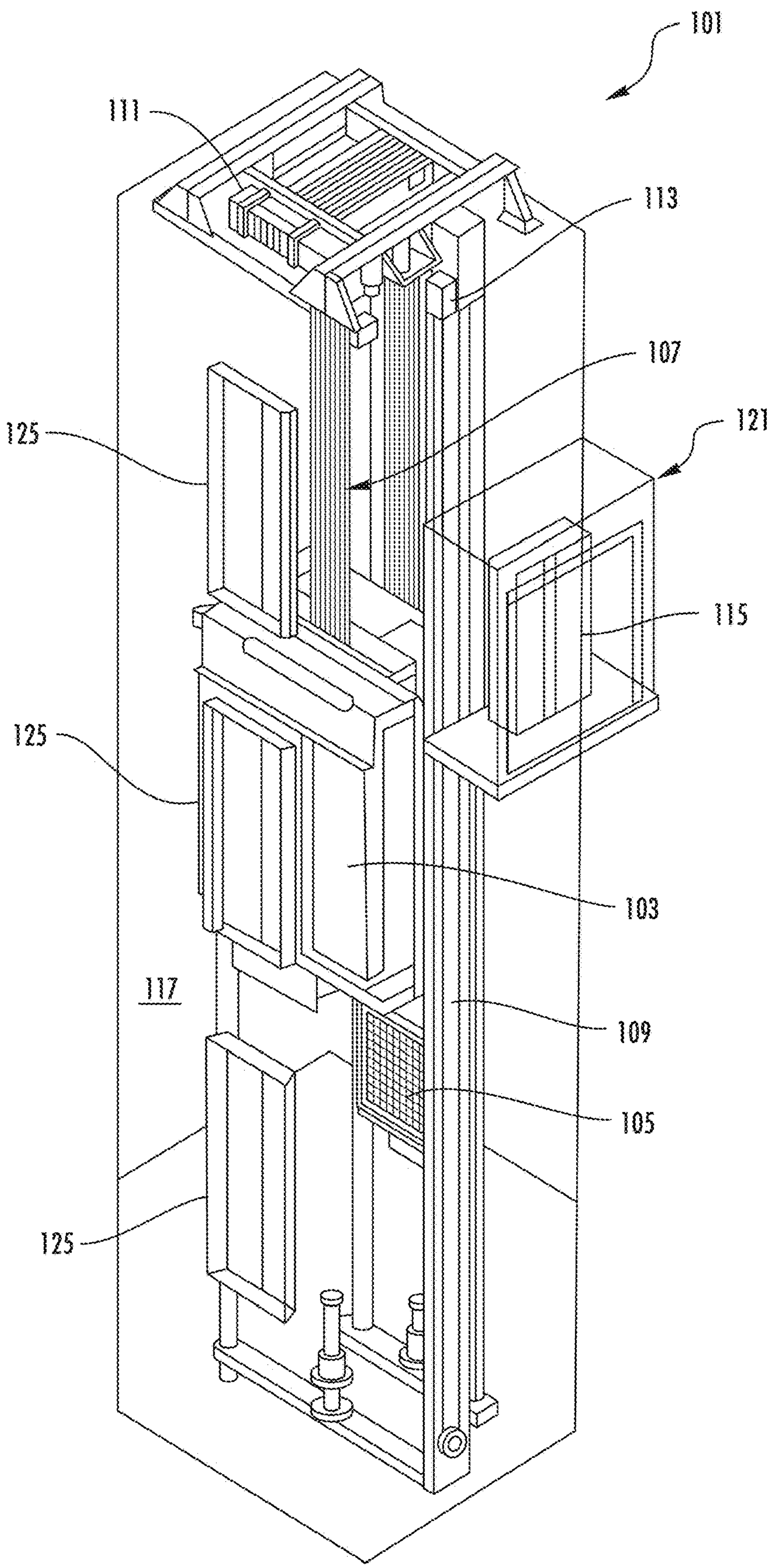
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
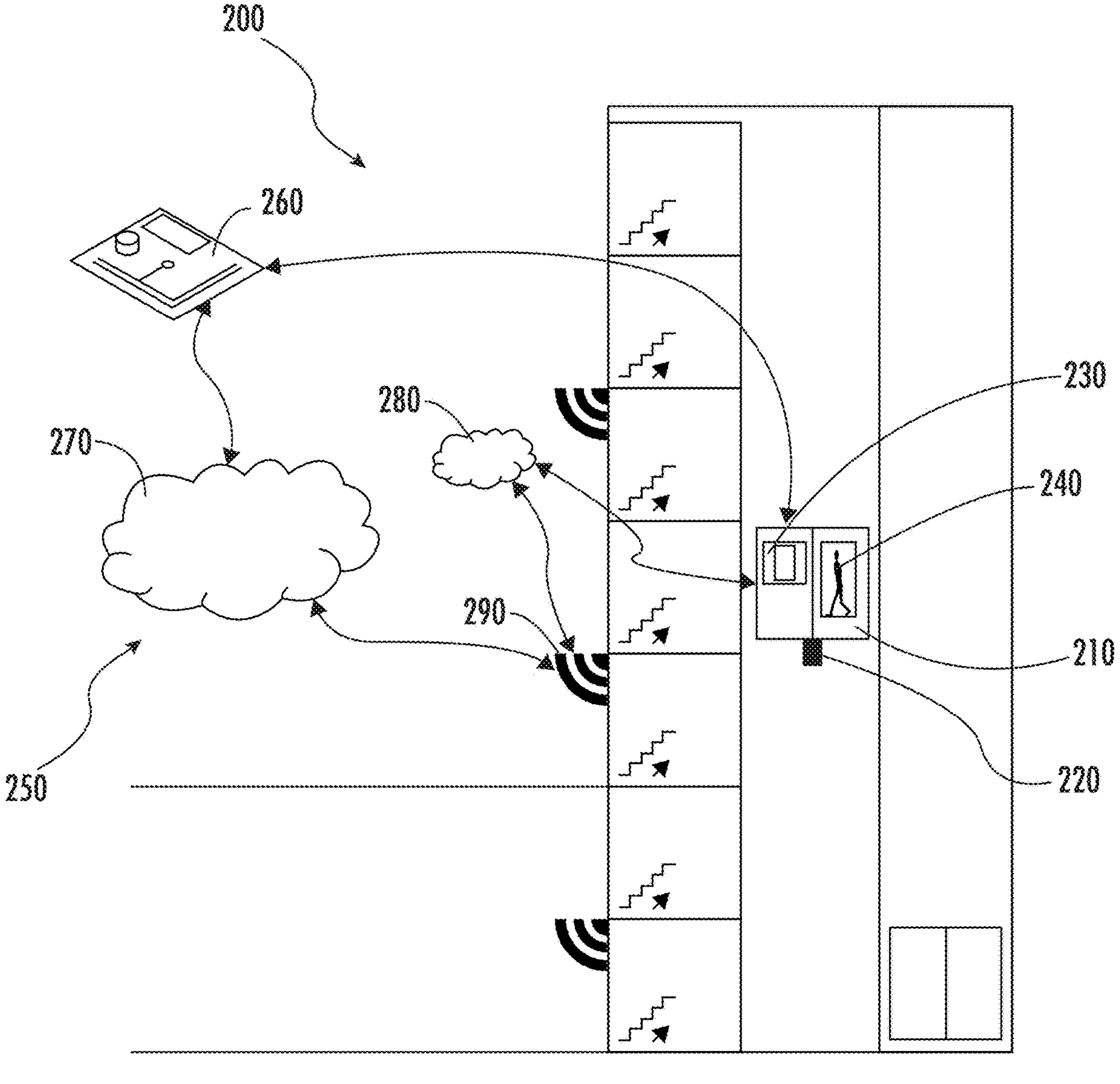
FIG. 2 illustrates components of a disclosed embodiment.

Turning to FIG. 2, disclosed is an elevator system 200 including an elevator car 210 and a sensor 220 operationally connected to the elevator car 210 and a portable smart device 230.

Figure 3:
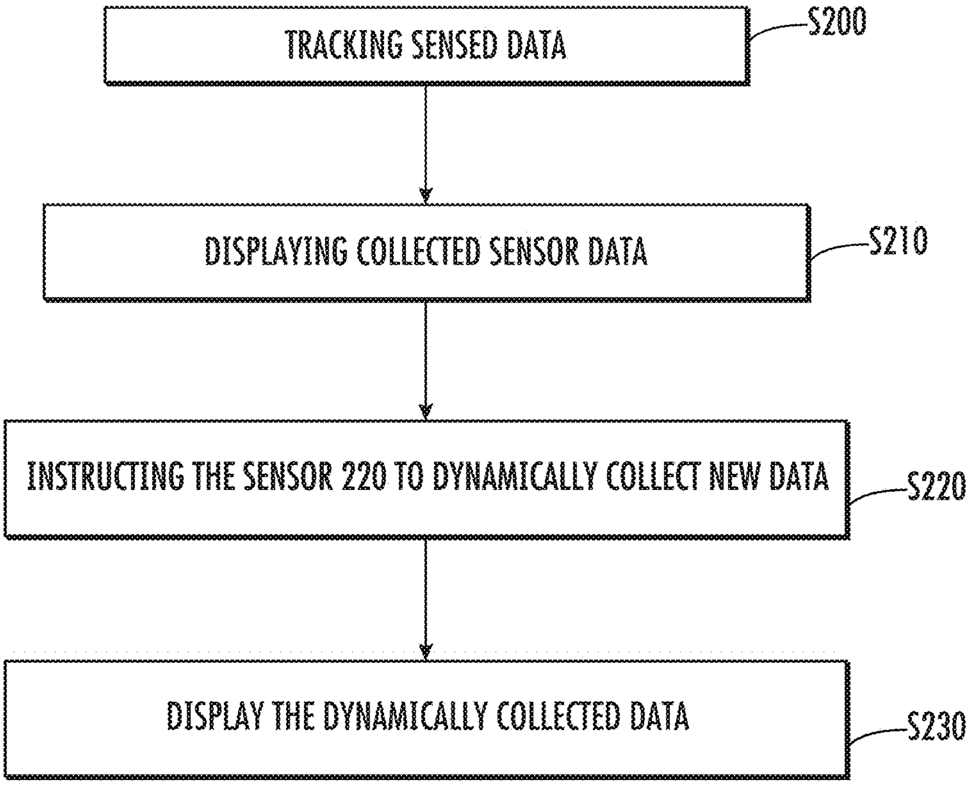
FIG. 3 illustrates steps performed by components according to an embodiment.

Turning to FIG. 3 the smart device 230 may perform a process S200 of tracking sensed data. S200 includes step S210 of the smart device 230 displaying collected sensor data, and step S220 of instructing the sensor 220 to dynamically collect new data. At step S230 the smart device 230 may display the dynamically collected data. This process enables dynamically illustrating trends in the sensed data. According to an embodiment the sensor 220 is configured to sense a ride characteristic. The ride characteristic may be ride quality.

According to an embodiment the smart device 230 is capable of instructing the sensor 220 to adjust sensitivity levels. Thus various levels of sensed data can be obtained an analyzed to enable calibrating the sensor 220 for results in a particular bandwidth of needed data. According to an embodiment the smart device 230 provides a scheduling calendar for scheduling elevator diagnostics based on the illustrated trends. That is, an elevator mechanic 240 with the smart device 230 can review data and determine therefrom whether to seek a full diagnostic of the elevator system.

According to an embodiment the smart device 230 may be a mobile phone. In addition the smart device 230 may communicates with the sensor 220 over a wireless ad hoc network 250. Alternatively the system 200 may include a controller 260 for operatively communicating with the sensor 220 over a local area network 270 and communicating with the smart device 230 over a personal area network 280. According to an embodiment the system 200 may comprise a telecommunications beacon 290 for effecting communications with the smart device 230 over the personal area network 280. In an embodiment the controller 260 is a building management system (BMS).

Disclosed above is a system with which an elevator mechanic is provided with access to view collected sensor data and/or activate a sensor to collect new data and schedule elevator diagnostics. The disclosed embodiments may provide for controlling sensor calibration levels to more accurately detect ride quality details, to provide for a better condition elevator service, to provide an improved service efficiency, and to increase user experience.

As used herein, "smart devices" may contain one or more processors capable of communication using with other such devices by applying wired and/or wireless telecommunication protocols. Non-limiting examples of a smart device include a mobile phone, personal data assistant (PDA), tablet, watch, wearable or other processor-based devices. Protocols applied by smart devices may include local area network (LAN) protocols and/or a private area network (PAN) protocols. LAN protocols may apply Wi-Fi technology, which is a technology based on the Section 802.11 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols may also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Wireless protocols may further include short range communication (SRC) protocols, which may be utilized with radio-frequency identification (RFID) technology. RFID may be used for communicating with an integrated chip (IC) on an RFID smartcard. Wireless protocols may further include long range, low powered wide area network (LoRa and LPWAN) protocols that enable low data rate communications to be made over long distances by sensors and actuators for machine-to-machine (M2M) and Internet of Things (IoT) applications.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system including an elevator car, a sensor secured to the elevator car, and a smart device that is a mobile phone, wherein the mobile phone communicates with the sensor with wireless protocols, the smart device is configured to:

display, on the smart device, collected sensor data, instruct the sensor to dynamically collect sensor data, displaying dynamically collected data, thereby dynamically illustrating trends in the sensed data;

wherein the collected data represents ride quality;

the smart device instructs the sensor to adjust sensitivity levels to provide sensor results within a predetermined bandwidth; and wherein, responsive to analyzing the illustrated trends from the collected data, the smart device provides a scheduling calendar for scheduling elevator system diagnostics.

2. The system of claim 1 wherein the smart device communicates with the sensor over a wireless ad hoc network.

3. The system of claim 1 further comprising a controller for operatively communicating with the sensor over a local area network and communicating with the smart device over a personal area network.

4. The system of claim 3 further comprising a telecommunications beacon for effecting communications with the smart device over the personal area network.

5. The system of claim 1 wherein the controller is a building management system (BMS).

6. A method of collecting data with an elevator system, the elevator system including an elevator car, a sensor secured to the elevator car, the method comprising:

display, on a smart device that is a mobile phone, wherein the mobile phone communicates with the sensor with wireless protocols, collected sensor data, instructing, with the smart device, the sensor to dynamically collect sensor data, displaying, on the smart device, dynamically collected data, thereby dynamically illustrating trends in the sensed data, wherein the collected data represents ride quality;

the smart device instructs the sensor to adjust sensitivity levels to provide sensor results within a predetermined bandwidth; and wherein, responsive to analyzing the illustrated trends from the collected data, the smart device provides a scheduling calendar for scheduling elevator system diagnostics.

7. The method of claim 6 wherein the smart device communicates with the sensor over a wireless ad hoc network.

8. The method of claim 6 further comprising a controller for operatively communicating with the sensor over a local area network and communicating with the smart device over a personal area network.

9. The method of claim 8 further comprising a telecommunications beacon for effecting communications with the smart device over the personal area network.

10. The method of claim 6 wherein the controller is a building management system (BMS).

* * * * *